United States Patent [19]

Takeuchi et al.

[11] 4,441,819

[45] Apr. 10, 1984

[54] CALIBRATION METHOD FOR PRINTING PLATE PICTURE PATTERN AREA METER

[75] Inventors: Hideo Takeuchi, Shirai; Satoru Horiguchi, Tsurugashima; Ryuzo Tamaki, Sagamihara, all of Japan

[73] Assignee: Dai Nippon Insatsu Kabushiki Kaisha, Japan

[21] Appl. No.: 311,603

[22] Filed: Oct. 15, 1981

[30] Foreign Application Priority Data

Oct. 24, 1980 [JP] Japan ............................ 55-149106
Oct. 24, 1980 [JP] Japan ............................ 55-149107

[51] Int. Cl.³ ........................................ G01B 11/28
[52] U.S. Cl. ............................ 356/380; 356/445
[58] Field of Search ..................... 356/380, 379, 445; 101/350, 365

[56] References Cited

U.S. PATENT DOCUMENTS 3,280,692 10/1966 Milnes et al. .................... 356/380
3,782,833 1/1974 Biggs et al. ...................... 356/380

*Primary Examiner*—Bruce Y. Arnold
*Attorney, Agent, or Firm*—Parkhurst & Oliff

[57] ABSTRACT

A calibration method is disclosed for a device in which an offset printing plate is optically scanned to measure the picture pattern area of the printing plate from the quantity of light reflected therefrom in which average values are obtained by scanning the printing plate plural times. The maximum and minimum of the average values are selected respectively as the quantity of light reflected from the non-printing-image region of the printing plate and as the quantity of light reflected from the printing image region of the printing plate in order to perform the calibration.

2 Claims, 18 Drawing Figures

CALIBRATION METHOD FOR PRINTING PLATE PICTURE PATTERN AREA METER

BACKGROUND OF THE INVENTION

This invention relates to a calibration system for a printing plate picture pattern area meter which measures the area of a printing image (or a picture pattern) from a printing plate for an offset press.

In order to measure a picture pattern area, a method of measuring a picture pattern area from a printing plate and methods in which a proof, a print, a reflecting original and a transparent original area used for detection, are available. The measurement value of a picture pattern area is utilized to check the density of a print during the operation of a printing machine, thereby to carry out feedback control, or the measurement value is utilized to preset the quantity of ink before the printing operation is started.

The picture pattern of an ordinary printing plate is such that a plurality of originals are printed thereon. Therefore, in the case where those other than a printing plate and a print are used for measurement of a picture pattern area, after each picture pattern area has been measured the measurement data must be added up with the layout on the printing plate taken into consideration. On the other hand, in the case where a printing plate and a print are used for the measurement, the measurement data can be utilized immediately. However, in the case where the measurement data are obtained from the print, a feedback control system for correcting variations due to external disturbances caused during the printing operation must be employed, because the measurement data have been obtained after the printing operation started. On the other hand, in the case where the measurement data are obtained from the printing plate, the degrees of opening of ink adjustment keys are preset before the printing operation starts, to provide satisfactory prints from the beginning of the printing operation.

Examples of the device in which a printing plate is utilized for measurement are as follows: In a first example of the device, a printing plate wound around a cylinder is rotated at high speed, and the average residual image of divisional areas thereof are measured (cf. Japanese Patent Application Publication No. 42205/1972). In a second example of the device, the original plate (or the printing plate) of an offset press is scanned to obtain the number of pulses which corresponds to the area of the printing image region, thereby to control the quantity of ink to be supplied (cf. Japanese Patent Application Laid-Open No. 53804/1973). In a third example of the device, the printing image of a printing plate is detected and integrated for every ink adjustment key, the quantity of light reflected from the non-printing-image is detected by using an auxiliary printing plate, and a signal for the printing image region only is calculated from the detection signals of the printing plate and is converted into a value corresponding to the printing image area, to control the quantity of ink (cf. Japanese Patent Application Laid-Open No. 67714/1974). In a fourth example of the device, an original plate is scanned longitudinally to measure the percentage of occupation of the printing image in the widthwise direction, so that the quantity of ink to be supplied is controlled in ink roller section (cf. Japanese Patent Application Laid-Open No. 2505/1976). In a fifth example of the device, a printing plate is longitudinally scanned with a photo-electric detector device which is set at a predetermined position in the lateral direction of the printing plate surface, to obtain the total quantity of ink, thereby to control the quantity of ink (cf. Japanese Patent Application Publication No. 47405/1972).

However, none of these conventional devices can perform the detection with high accuracy, and accordingly they are not practical in use. This will be described in more detail. After a transparent film original is printed on a printing plate through contact exposure, in general the printing plate is processed according to processing steps shown in FIG. 1. A positive type printing plate usually employed is developed (Step S1) in order to remove the photo-sensitive layer of a region (non-printing-image region) which has been exposed to light, thereby to make an ink repellent surface. After the developing treatment, the remaining unnecessary photo-sensitive layer is dissolved with an erasing solution (Step S3). After being dried (Step S4), an affinitizing solution is applied to the entire printing plate (Step S5). Then, the printing plate surface is dried through buffing to the extent that no affinitizing solution is left on the printing plate surface (Step S7). The affinitizing and buffing treatments are preparatory treatments which are carried before a burning treatment (or high temperature heat treatment) is carried out. By performing the burning treatment (Step S8), the printing withstanding characteristic of the print plate is increased twice or thrice. In order to protect the surface of the non-printing-image region and to increase its hydrophilic characteristic, a so-called "gumming treatment" is carried out (Step S10). Thus, the printing plate has been completely processed. In these processing steps, the burning treatment is considerably effective in improving the printing withstanding characteristic of the printing plate. However, in the burning treatment, the printing plate is heated at a high temperature 250° C. to 300° C., and therefore the ordinary printing plate whose base is aluminum is deformed by heat, and it remains deformed even after it has cooled; that is, the flatness of the printing plate surface is degraded. Accordingly, when the quantity of reflected light is detected in order to obtain a picture pattern area from such a printing plate, the quantity of reflected light varies depending on the picture pattern area and according to the degree of roughness of the printing plate and to the amount of displacement of the printing plate. Thus, the detection cannot be made with high accuracy, and accordingly it is impossible to accurately determine the quantity of ink to be supplied.

In a printing factory having a number of printing machines of different kinds, in general a variety of printing plates are handled in the printing operation. Therefore, it is more preferable to use the picture pattern area meter on the printing line in the printing site so that one measuring device measures data for performing the ink adjustments of a number of printing machines than to use it with a single printing machine in the printing site.

SUMMARY OF THE INVENTION

Accordingly, an object of this invention is to provide a calibration system for a printing picture pattern area rate meter, which meets the above-described requirement and is free from the above-described drawbacks.

Provided according to one aspect of the invention is a calibration system for a device in which, while a detection region of an offset printing plate is being scanned, light is applied thereto, and the picture pattern area of the printing plate is measured from a quantity of light reflected therefrom; in which the scanning operation is carried out plural times for every predetermined distance to obtain average values successively, among the average values the maximum value and the minimum value are selected, and calibration is carried out with the maximum value and the minimum value respectively as a quantity of light reflected from the non-printing-image region of the printing plate and a quantity of light reflected from the solid part (a region entirely inked) in the printing image region of the printing plate.

Provided according to another aspect of the invention is a calibration system for a device in which, while a detection region of an offset printing plate is being scanned, light is applied thereto, and the picture pattern area of the printing plate is measured from a quantity of light reflected therefrom; in which the scanning operation is carried out plural times for every predetermined distance to obtain average values successively, among the average values the minimum value is employed as the calibration value of the solid part (a region entirely inked) in the printing image region of the printing plate, the front and rear end portions of the printing plate are employed as calibration regions, and a value obtained by scanning the calibration regions is employed as a calibration value of the non-printing-image region of the printing plate.

The nature, principle and utility of the invention will become more apparent from the following detailed description when read in conjunction with the accompanying drawings.

DETAILED DESCRIPTION OF THE INVENTION

Figure 1:
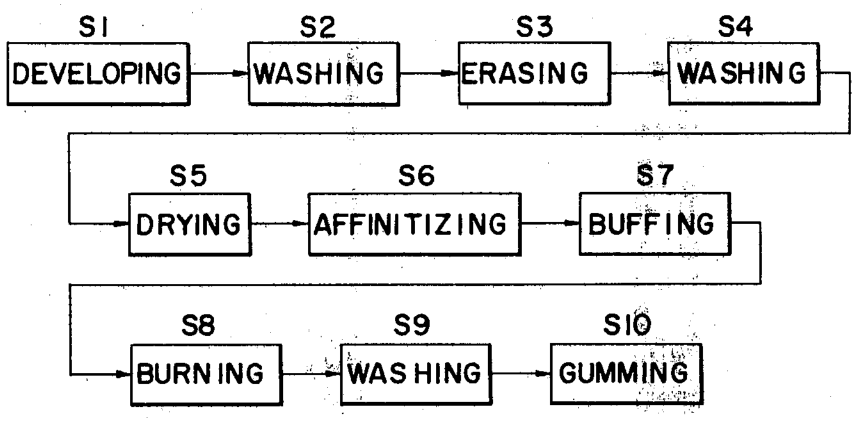
FIG. 1 is a flow chart showing steps of processing a printing plate.
Figure 2:
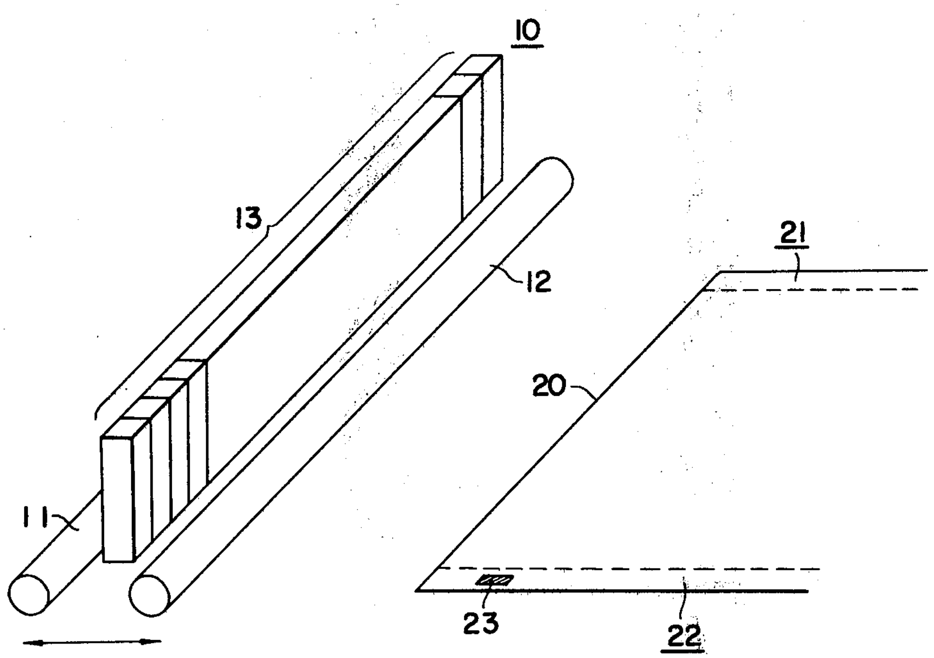
FIG. 2 is an explanatory diagram showing the positional relationships between a movable photo-electric detector means according to this invention and a printing plate.

In this invention, as shown in FIG. 2, a printing plate 20 is fixedly disposed below a movable photo-electric detector means 10, and it is scanned linearly by moving the photo-electric detector means 10 with a conveying device (described later).

A calibration mark 23 in the form of a rectangle or the like is marked at an optional position on one gripper end 21 or the other end 22 of the printing plate 20 (which is a portion of the printing plate 20 which will not adversely effect printing). A solid region (a region entirely inked) in the printing image region of the printing plate may be employed as the calibration mark. In the printing plate, the non-printing-image region (Al grained region) and the printing image region (picture pattern region) can be recognized with the aid of the calibration mark.

Figure 3:
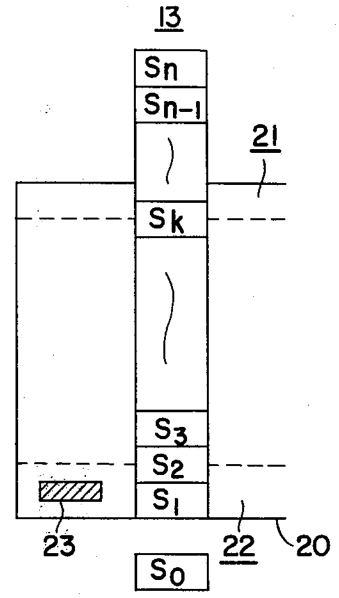
FIG. 3 is a diagram showing the scanning detection operation of the photo-electric detector means.
Figure 4:
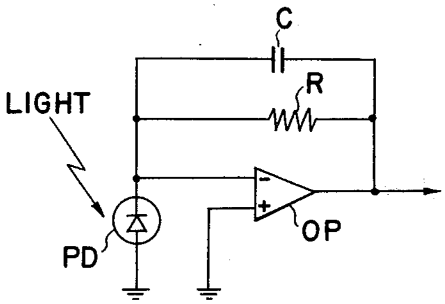
FIG. 4 is a circuit diagram showing one example of the arrangement of detector elements in the photo-electric detector means.

The photo-electric detector means 10 comprises: a pair of cylindrical fluorescent lamps 11 and 12 which are arranged in parallel to form a linear illumination surface; and a photo-electric detector assembly 13 having a number of photo-electric detectors $S_0$, $S_1$, $S_2$, . . . and $S_n$ which are arranged in one line between the fluorescent lamps 11 and 12 as shown in FIG. 3. Each photo-electric detector 13, as shown in FIG. 4, comprises: a photo-diode PD for converting light from the printing plate 20 into an electrical signal; an operational amplifier to one input terminal of which the output of the photo-diode PD is applied (the other input terminal being grounded); and a resistor R and a capacitor C connected between the input and output of the operational amplifier OP.

Figure 5A:
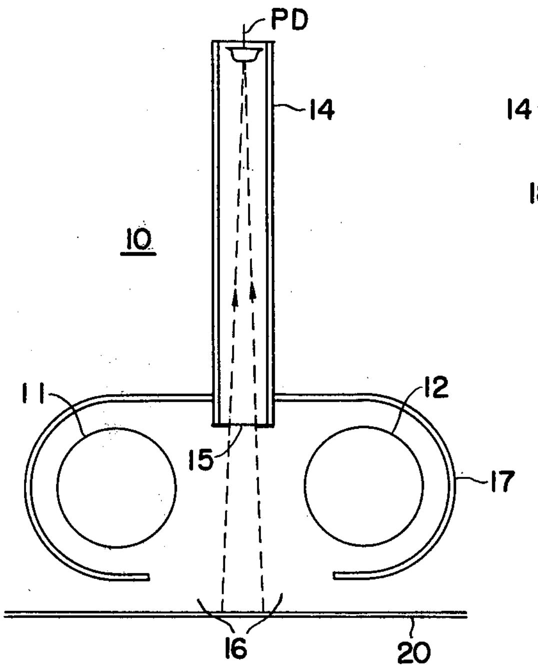
FIGS. 5A and 5B are a side view and a front view outlining the construction of the photo-electric detector means, respectively.
Figure 5B:
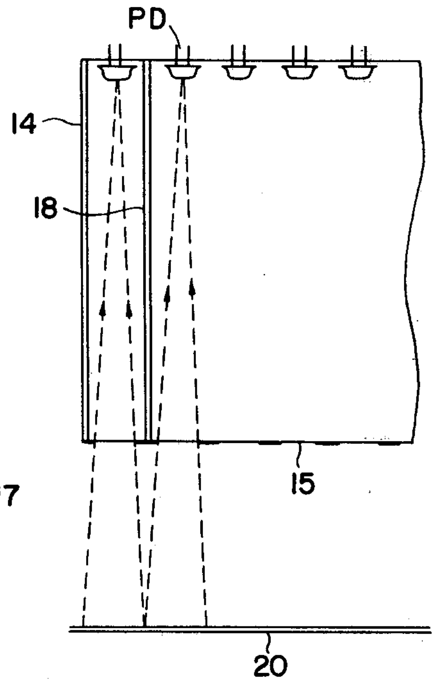

The photo-electric detector assembly 13 (or $S_0$ through $S_n$) is constructed as shown in FIGS. 5A and 5B. More specifically, the photo-electric detector assembly 13 has a shield box 14 on the top of which the photo-diodes PD for photo-electric detection are mounted. Slits 15 for receiving light reflected from the printing plate are cut in the bottom of the shield box 14. The shield box 14 has a light intercepting box 17 substantially at the lower end. The light intercepting box 17 is so formed that it surrounds all of the slits 15 in the shield box 14 and intercepts light from the fluorescent lamps 11 and 12 and that it has a slit 16 for receiving light reflected from the printing plate 20. In the shield box 14, a partition plate 18 for parting the optical path is provided between a calibration mark (23) detecting section and a picture pattern detecting section.

Figure 6A:
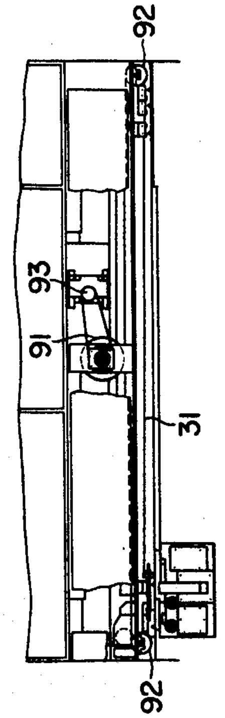
FIGS. 6A, 6B and 6C are a front view, a plan view and a side view showing the external arrangement of a measuring device according to the invention, respectively.
Figure 6B:
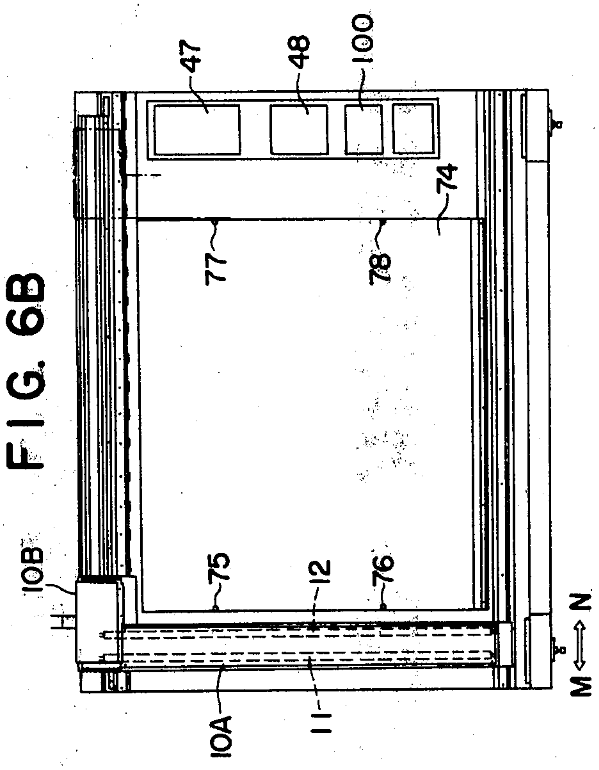
Figure 6C:
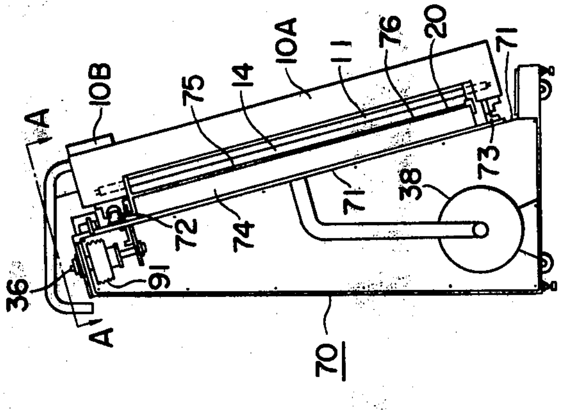

An actual arrangement of the above-described photo-electric detector means 10 is as shown in FIGS. 6A, 6B and 6C. A measuring device body 70 has a front panel 71 which is held slantingly. Guide rails 72 and 73 are provided at the upper and lower edges of the front panel 71, respectively. A stage 74 for mounting a printing plate 20 is arranged at the middle of the front panel 71. A printing plate 20 is positioned with pins 75 through 78 and is retained on the stage 74 by being sucked by a sucking device 38. For this purpose, the stage 74 is made of a porous sheet or a plate having a number of minute holes.

A scanning device 10A in the form of a box incorporating the photo-electric detector means 10 and the relevant circuits is slidably arranged between the guide rails 72 and 73. The printing plate 20 is interposed between the scanning device 10A and the stage 74. As the scanning device 10A is moved in the directions M and N by driving a scanning rope 31, the photo-electric detector means 10 arranged below the scanning device 10A scans the printing plate 20 linearly. An input means such as a key board 47 for instructing the operation of the scanning device 10A, an output means such as a printer 48 for displaying the scanning results of the scanning device 10A, a magnetic card output means 100 (FIG. 12) for writing the scanning results of the scanning device 10A in a magnetic card inserted therein to facilitate the next off-set printing operation, and a power switch 110 are provided beside the stage 74 on the front panel 71.

The top 10B of the scanning device 10A is fixedly secured to the scanning rope 31 which is wound around a driver roller 91 and an auxiliary roller 92 which are provided at both ends of the upper edge of the front panel 71. As the scanning mechanism of the scanning device 10A is constructed as described above, the scanning device 10A is slid on the guide rails 72 and 73 in the directions M and N by turning the drive roller 91 with a drive motor 93. A rotary encoder 36 is coupled to the shaft of the drive roller 91, in order to detect the position of the scanning device 10A. The afore-mentioned sucking device 38, such as a suction pump, is provided below the stage 74, to suck and retain the printing plate 20 on the stage 74.

Figure 7:
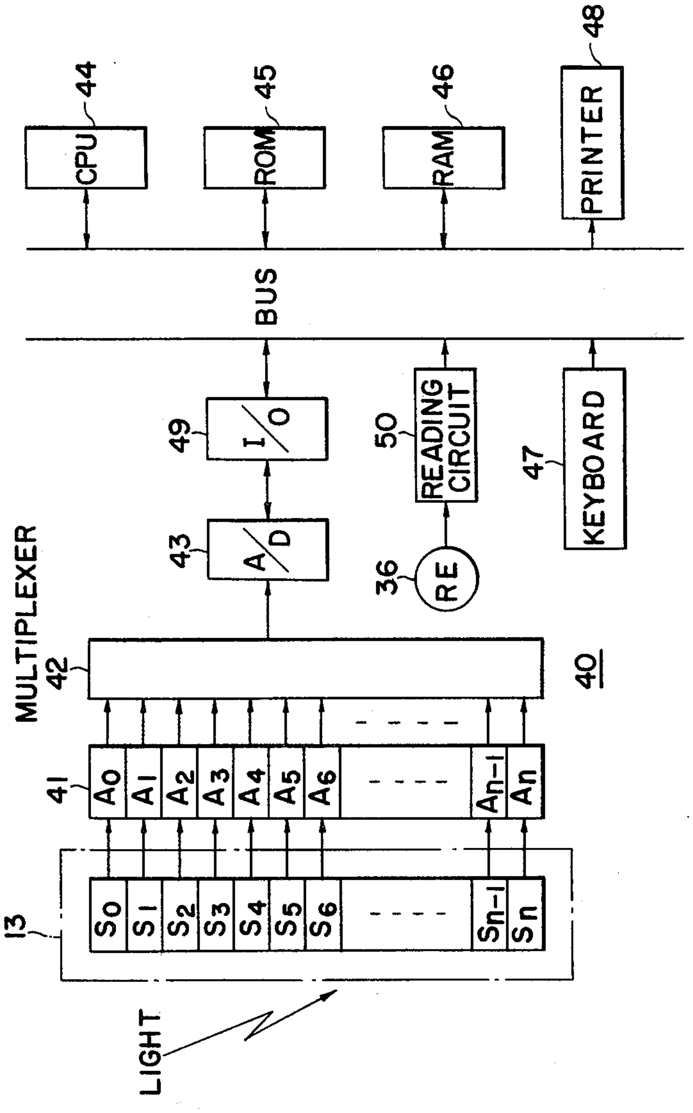
FIG. 7 is a block diagram showing one example of the arrangement of a processing device according to the invention.

A processing device 40 for obtaining a picture pattern area from detection signals, as shown in FIG. 7, comprises: an amplifier circuit assembly 41 having amplifier circuits $A_0$ through $A_n$ for amplifying the detection signals of the photo-electric detectors of the photo-electric detector assembly 13, respectively; a multiplexor 42 for selectively outputting signals from the amplifier circuit assembly 41 according to a processing program; an A/D (analog-to-digital) converter 43 for converting the output of the multiplexor 42 into a digital signal; a CPU (microprocessor) 44; memory means comprising a ROM (read-only memory) 45 and a RAM (random access memory) 46; a keyboard 47 for inputting data and other necessary numerical values; a printer 48 for printing out process results; and an input-output control device 49 for controlling the input and output operations between the A/D converter 43 and other circuit elements such as for instance the CPU 44. The input-output control device 49 is coupled through a bus to the CPU 44, the ROM 45, the RAM 46, the keyboard 47, and the printer 48. The output of the rotary encoder 36 is applied through a reading circuit 50 and the bus to the CPU 44.

Figure 8:
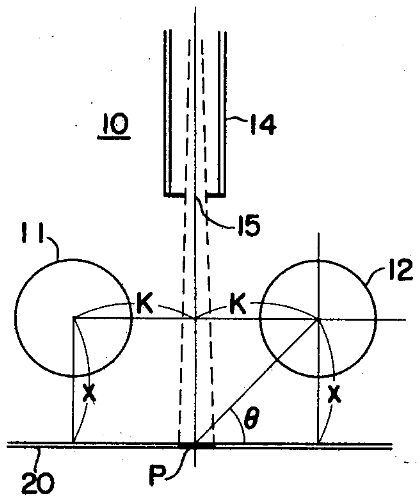
FIG. 8 is an explanatory diagram for a description of the optimum relative position of a printing plate and fluorescent lamps.

A detection error due to the roughness of a printing plate surface which is caused by the burning process can be minimized by setting the relative positional relation between the printing plate 20 and the photo-electric detector means 10 (including the fluorescent lamps 11 and 12) as follows: As shown in FIG. 8, the fluorescent lamps 11 and 12 are arranged in parallel with the printing plate 20. The printing plate is set at the standard position which is apart from the centers of the fluorescent lamps 11 and 12 as much as a distance (x) equal to 0.35 to 0.70 times, preferably 0.4 to 0.6 times, the distance (2K) between the centers of the lamps 11 and 12. Assuming that a region around positions on the printing plate (20) surface which are equidistant from the two lamps 11 and 12 is a detection region P, the photo-electric detector means 10 is confronted with the printing plate 20 so as to receive only light reflected from the detection region P. Thus, the term "relative positional relation" is intended to mean a relative positional relation which is most suitable for measurement.

The transmission of light between the photo-electric detector means 10 and the printing plate 20 will be described. Since the fluorescent lamps 11 and 12 form a line light source, the intensity of illumination is inversely proportional to the distance from the light source. In the case of a point light source, the intensity of illumination is inversely proportional to the square of the distance from the light source. However, in the case of a line light source, it can be considered that the line light source is formed by collecting a number of point light sources in the form of a line. Therefore, if an integration calculation is carried out with the intensity of illumination of a surface as the sum of the intensities of illumination by all of the point light sources, then it can be found that the intensity of illumination of the surface is in inverse proportion to the distance from the light source. On the other hand, the intensity of illumination of a first surface which is not perpendicular to a projection light beam is sin $\theta$ times the intensity of illumination of a second surface which is perpendicular to the projection light beam (where $\theta$ is the angle between the first surface and the light beam). Therefore, the intensity of illumination (I) of the detection region P in FIG. 8 can be represented by the following expression (1):

$$I_{(x)} = A\frac{x}{K^2 + x^2} \quad (1)$$

where A is the proportional constant.

Figure 9:
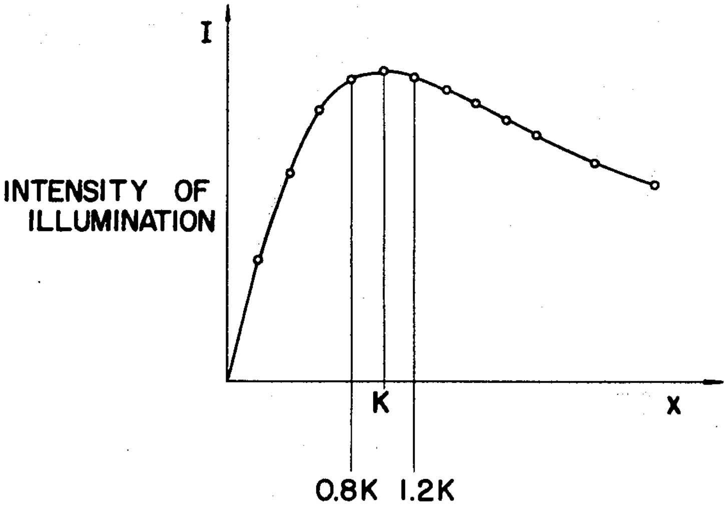
FIG. 9 is a graphical representation indicating illumination intensity with distance (x), which is utilized in association with FIG. 8.

If the printing plate 20 is set at a predetermined position $x_0$ and the positional difference of the printing plate (2) surface due to its roughness is $\Delta x_0$, then there is a difference in the intensity of illumination which corresponds to the difference between the value of the expression (1) with $x = x_0$ and the value of the expression (1) with $x = x_0 + \Delta x_0$. Therefore, a measurement error is caused in correspondence to the difference in the intensity of illumination. The intensity of illumination $I_{(x)}$ is a function which has its maximum value when $x = K$ as shown in FIG. 9. In the vicinity of the maximum value, the variation of the intensity of illumination $I_{(x)}$ with respect to the same positional difference $\Delta x_0$ is smaller. Accordingly, if the printing plate 20 is set at a position which satisfies $x = K$ and the detector means 10 is operated to detect the detection region P, then the measurement can be achieved accurately, even if the printing plate 20 has an uneven surface. Also in the range of $0.8K < x < 1.2K$, i.e. $0.4 \times 2K < x < 0.6 \times 2K$, the characteristic is substantially linear, and therefore the measurement can be achieved with high accuracy.

Figure 10:
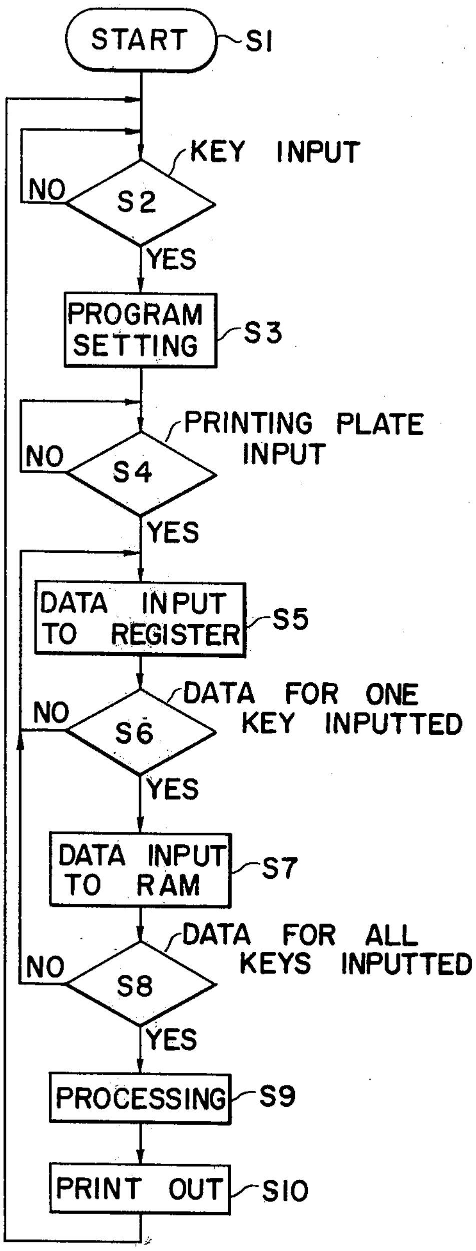
FIG. 10 is a flow chart showing one example of the operation of the device according to the invention.

The operation of the measuring device thus organized will be described with reference to a flow chart shown in FIG. 10.

When the power switch is turned on (STEP S1) after the printing plate 20 has been set on the stage 74 with the pins 75 and 76, the sucking device 38 is operated to fixedly retain the printing plate 20 on the stage 74 and simultaneously the fluorescent lamps 11 and 12 are turned on. Then, a printing machine number, and surface classification as to surface printing or backing printing, for instance, in the case of a blanket to blanket system printing machine are inputted by the key board 47 (Step S2). By inputting these data, data provided for the ROM 45 are set. Examples of the data which are set in the RAM 46 or the ROM 45 are a printing plate size (such as 1310 mm×1050 mm, or 1160 mm×940 mm), the number of ink adjustment keys (for instance, 32 or 50), a key distance (for instance 30 mm or 40 mm), the distance between a key and a printing plate edge (for instance 5 mm or 10 mm), the distance between an effective printing area and a printing plate edge (for instance 22 mm for the upper and lower, and 20 mm for the right and left), etc. Thus, the range of use of the photo-electric detector assembly 13 (or $S_1$ through $S_k$ in FIG. 3), the ink adjustment key distance and number, etc. have been set (Step S3).

When, under this condition, a measurement start switch is depressed, a motor (not shown) is driven, so that the scanning device 10A is moved in the direction M or N (FIG. 6B) through a gear mechanism, for example a pinion and a rack (not shown), while the photo-electric detector means 10 in the scanning device 10A scans the surface of the printing plate 20. The scanning position of the photo-electric detector means 10 is detected by the rotary encoder 36, and the detection signal is applied through the reading circuit 50 and the bus to the CPU 44, so that the detection position is coincided in timing with the detection scanning movement. Light from the fluorescent lamps 11 and 12 in the photo-electric detector means 10 falls on the printing plate 20 (or the stage 74) through the slit 16, and light reflected therefrom reaches the photo-diodes PD through the slits 15 formed in the shield box 14, so that it is converted into an electrical data corresponding to the quantity of light. In FIG. 3, the photo-electric detector $S_0$ operates to detect the non-printing-image region and the calibration mark 23 in order to calibrate the upper limit and the lower limit of the quantity of reflected light, and the photo-electric detector $S_k$ is used to take only the detection output of the effective printing region as data.

When the output position data of the rotary encoder 36 coincides with the printing plate edge position data which is set in the program, the quantity of light reflected from the printing plate 20 is detected by the photo-electric detector means 10 (Step S4). The detection data selectively outputted by the multiplexor 42 according to the program, after being converted into digital data by the A/D converter 43, is inputted into a register in the CPU 44 through the input-output control circuit 49 and the bus (Step S5). When the data corresponding to one ink adjustment key has been inputted (Step S6), the data is transferred from the register in the CPU 44 to the RAM 46 (Step S7). In this case, the calibration mark 23 is processed in the same manner. The outputs of the photo-electric detector assembly 13 are selectively delivered by the multiplexor 42, as was described above, and the output thus selected, after being subjected to A/D conversion, is stored in the address in the RAM 46, which corresponds to the object under detection (the calibration mark or the picture pattern).

The calibration mark will be described in more detail. Whenever the scanning device 10A moves 3 mm for instance, the photo-electric detector $S_0$ (for instance) measures the quantity of light reflected from the gripper end 22 (or the other gripper end 21 or the region of the printing plate which will not adversely affect printing). Whenever the detector $S_0$ measures the quantity of light reflected therefrom, the average of the past measurement values, for instance four past measurement values, is obtained and stored.

It is assumed that, without obtaining the average of several past measurement values, when the scanning device 10A moves 3 mm, the photo-electric detector $S_0$ measures the quantity of light reflected from the gripper end 22. If the measurement value is represented by $X_i$, then the maximum value $AD_{max}$ among $X_1$ through $X_n$ is:

$$AD_{max}=MAX(X_1, X_2, \ldots X_n) \tag{2}$$

and the minimum value $AD_{min}$ among $X_1$ through $X_n$ is:

$$AD_{min}=MIN(X_1, X_2, \ldots X_n) \tag{3}$$

With $AD_{max}$ as the quantity of light reflected from the non-printing-image region and with $AD_{min}$ as the quantity of light reflected from the solid part of the printing image region, the data are processed. In this connection, $$1 \leqq i \leqq n \tag{4}$$

(where n is the total number of measurements). However, in the method, the effect of optical disturbance or reflection appears in the data $AD_{max}$ and $AD_{min}$, as it is, and therefore the measurement accuracy is decreased as much.

In order to overcome the drawback, in the invention, whenever one measurement is carried out, the average $Y_i$ of four past measurement values is obtained (the better result being obtained from averaging more measurement values), and the maximum value $AD_{max}$ and the minimum value $AD_{min}$ of $Y_i$ are obtained. That is, the following expression (5) is calculated, and the calculation result is compared with the maximum value and the minimum value.

$$Y_i = \frac{X_i + X_{i-1} + X_{i-2} + X_{i-3}}{4} \tag{5}$$

In other words, the following expressions (6) and (7) are calculated and the calculation results are employed for data processing later.

$$AD_{max}=MAX(Y_4, Y_5, \ldots Y_n) \tag{6}$$

$$AD_{min}=MIN(Y_4, Y_5, \ldots Y_n) \tag{7}$$

It is assumed that the photo-electric detectors in the detection area have numbers $S_1$ through $S_k$ beginning with the lowest one, and the detecting head is positioned at 1 through m in the case where the measurement is carried out whenever it moves 3 mm, for instance. In this connection, m is the largest integer which satisfies $m \leqq \frac{1}{3}$ when the key pitch is one (1). If the outputs of all the sensors at all the positions are represented by $Z_{ij}$($1 \leqq i \leqq k$, and $1 \leqq j \leqq m$), then the average value $\overline{Z}$ of the outputs $Z_{ij}$ is:

$$\bar{Z}=\left\{\sum_{i=1}^{k}\left(\sum_{j=1}^{m}Z_{ij}\right)\right\}\cdot\frac{1}{m\cdot k} \quad (8)$$

For the remaining keys, the averages $\bar{Z}$ are obtained and stored. After the measurement has been repeated as many times as the total number of ink adjustment keys, the area rate R can be obtained from the following expression (9):

$$R=\frac{\bar{Z}-AD_{min}}{AD_{max}-AD_{min}}\times 100\ (\%) \quad (9)$$

In this case, the brightest region is calculated as 100% and the darkest region is calculated as 0%; however, in practical use it is preferable that the brighest region is expressed as 0% and the darkest region as 100%, and therefore the following calculation is additionally employed for display:

$$R'=100-R(\%) \quad (10)$$

Thus, the effect of optical disturbance or reflection is eliminated, which contributes to an improvement of the measurement accuracy.

Figure 11:
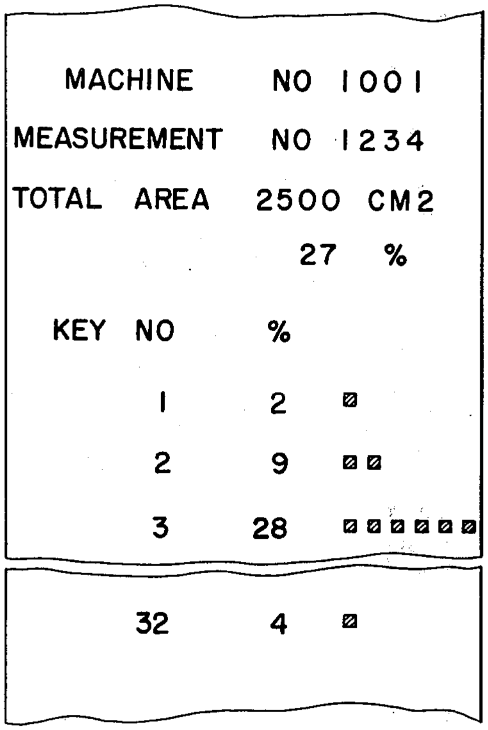
FIG. 11 is a diagram showing one example of data printed out in the invention.

After the area rates for all of the ink adjustment keys have been calculated, they are printed out by the printer 48, for instance as shown in FIG. 11; however, they may be written in the magnetic card.

Figure 12:
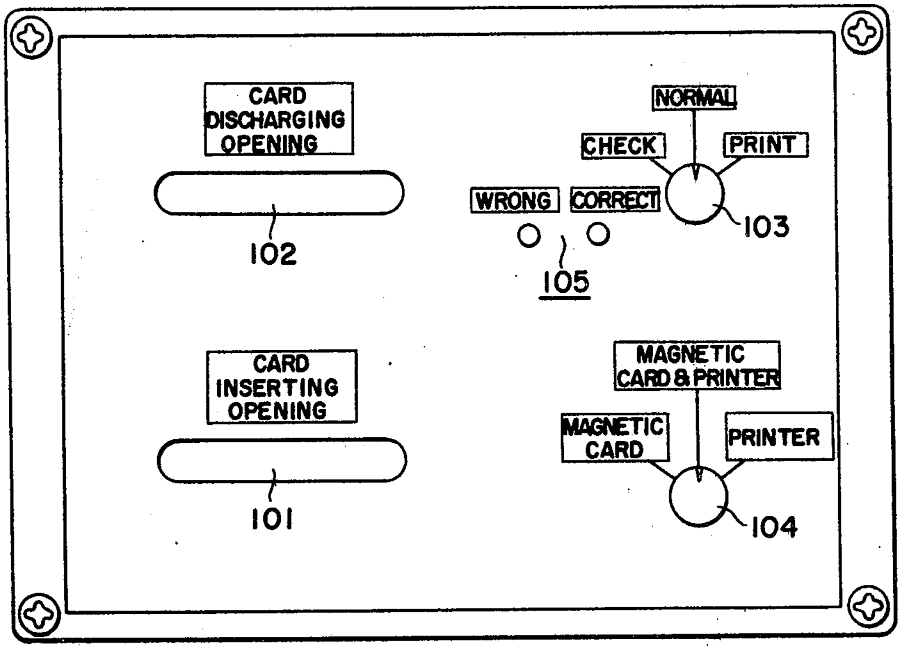
FIG. 12 is a diagram showing one example of the panel of a magnetic card output means according to the invention.

The panel of a magnetic card output means 100, as shown in FIG. 12, has: a card inserting opening 101 for inserting a magnetic card; a card discharging opening 102 for discharging a magnetic card on which predetermined data are written, the card discharging opening 102 being arranged above the card inserting opening 101; a mode changing switch 103 for switching operation modes (i.e. a check mode, a normal mode and a print mode); an output changing switch 104 for switching output modes (only the magnetic card, only the printer and both of the magnetic card and printer); and display lamps 105 for displaying whether or not the operation is correct.

Figure 13:
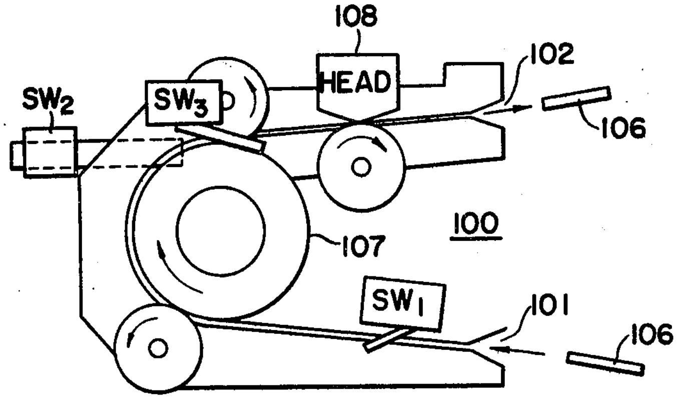
FIG. 13 is a diagram showing the internal construction of the magnetic card output means shown in FIG. 12.
Figure 14:
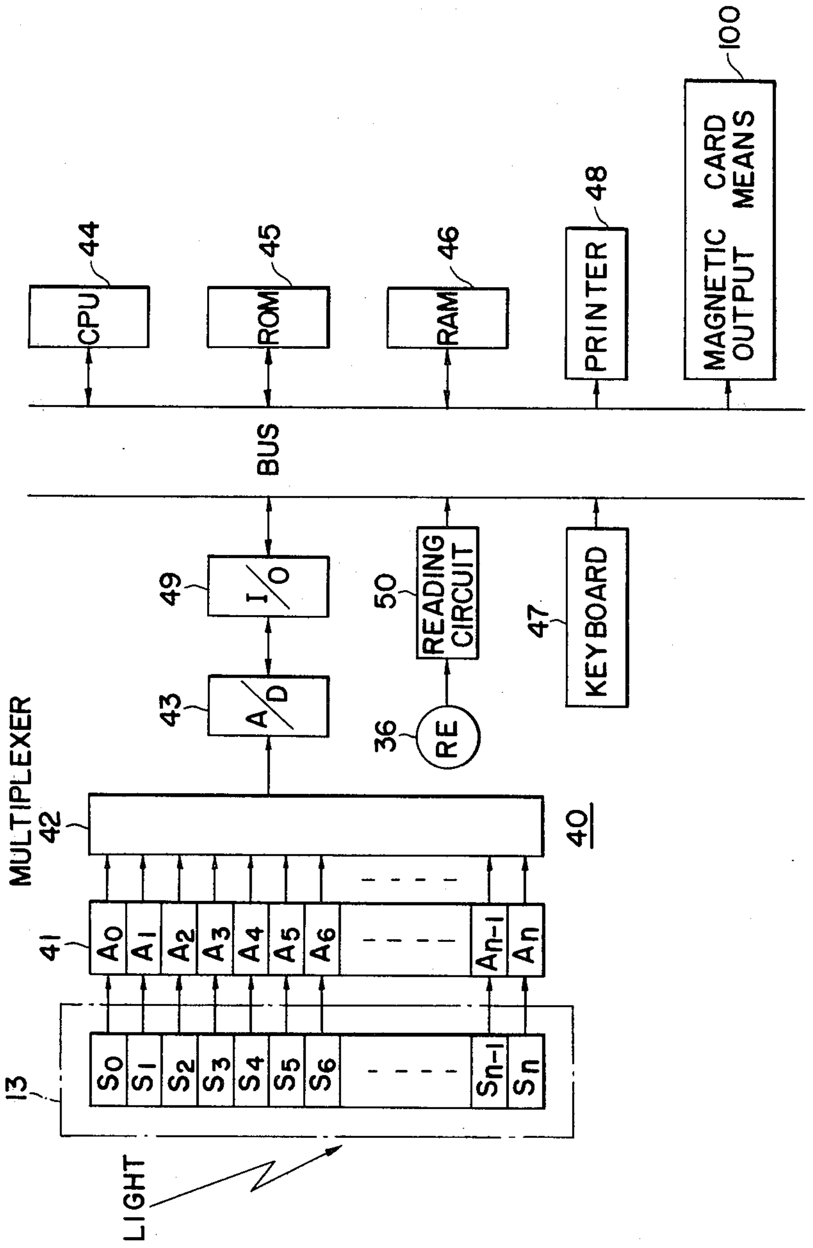
FIG. 14 is a block diagram showing another example of the processing device according to the invention.

The internal construction of the magnetic card output means 100 is as shown in FIG. 13. A magnetic card 106 is inserted into the magnetic card output means 100 through the card inserting opening 101 and is then delivered to a rubber roller 107 which serves as a guide also, through a limit switch $SW_1$. The magnetic card 106 thus delivered, is further conveyed while being nipped by the rubber roller 107 and its auxiliary roller. After predetermined data have been written in the magnetic card 106 by a magnetic head 108 in response to the detection timing of limit switches $SW_2$ and $SW_3$ arranged above the rubber roller 107, the magnetic card 106 is discharged through the card discharging opening 102.

Figure 15:
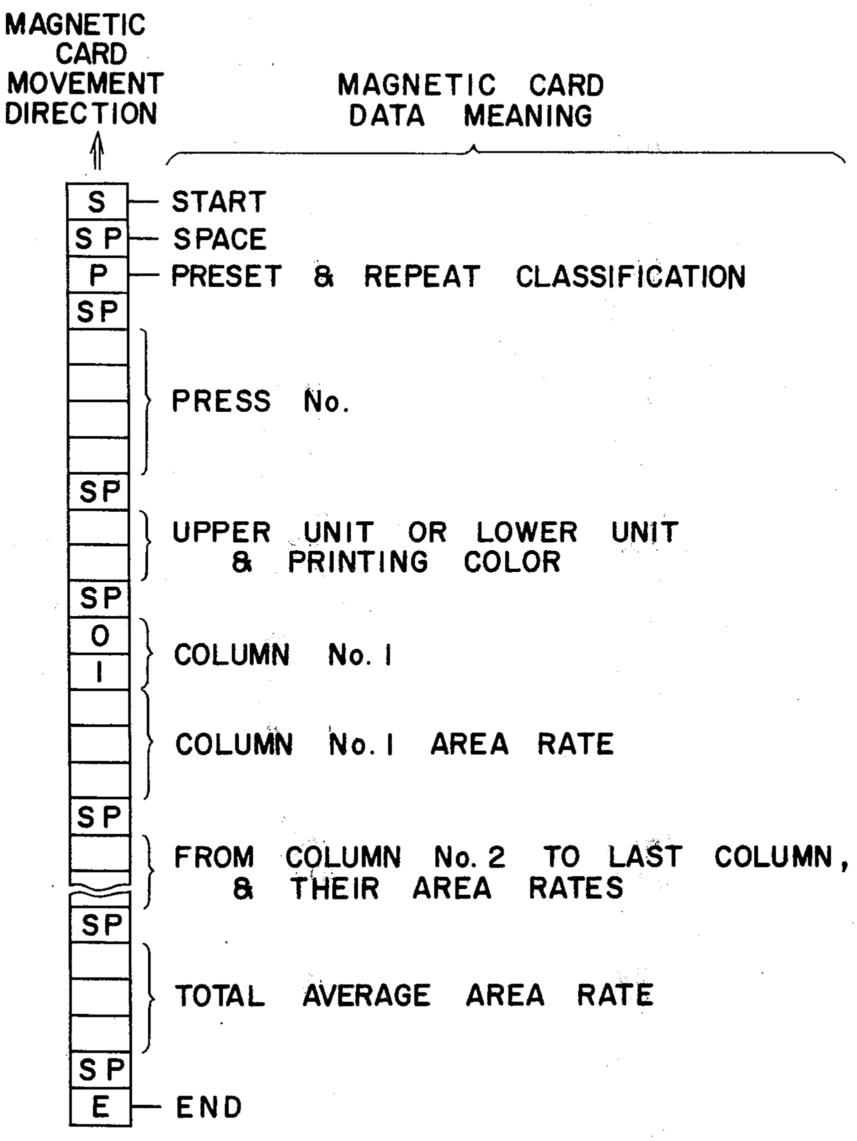
FIG. 15 is a diagram showing one example of the data which are written in a magnetic card.

In the device, the obtained picture pattern area and area rates are outputted by the printer 48 and/or the magnetic card output means 100 separately according to the output modes selected by the output changing switch 104. One example of the data written in the magnetic card is as shown in FIG. 15, and one example of the data printed out is as shown in FIG. 11. The mode changing switch 103 is maintained set for the normal mode during the above-described measurement. If, after the measurement, the switch 103 is set for the check mode and the outputted magnetic card is inserted into the card inserting opening 101, the data written in the magnetic card are automatically read to determine whether or not the data are correct. If the data are correct, one of the display lamps 105 is turned on; and if the data are not correct, the other display lamp 105 is turned on. In the latter case, the data are rewritten automatically by inserting the magnetic card into the card inserting opening 101 again.

As is apparent from the above description, with the measuring device employing the calibration system according to the invention, the picture pattern area can be measured correctly independently of the differences in process of printing plates or the differences in kind, lot and size of printing plates and without being affected by the thermal deformation of a printing plate which is caused by burning treatment, and the measurement can be carried out in conformance to the widths and numbers of ink adjustment keys which are different with different kinds of printing machines. Accordingly, it is unnecessary to provide the measuring device for each of the printing machines; that is, only one measuring device can be provided for the printing plate line.

Since the measurement is made directly from a printing plate, unlike the measurement made from a transparent original (such as a film original), it is unnecessary to process the measured data for the layout of the picture pattern, and the relative position of the printing plate and the detecting device is scarcely affected by the mechanical error of the device and by the deformation of the printing plate, with the result that the device can be manufactured at low cost and the measurement can be achieved with high accuracy. Furthermore, in-line automatic measurement can be effected for the printing plate line, and the burden of measurement is small.

The picture pattern measurement data can increase the operating efficiency of the printing machine by presetting the ink adjustment keys at the start of the printing machine operation, thus reducing the number of unsatisfactory prints. Furthermore, the picture pattern measurement data are applicable to various objects, such as the estimation of the quantity of special color ink to be prepared and the economical use of fuel by providing optimum conditions for a roll-fed offset printing press drier (adapted to dry ink on a print with a burner).

In the invention, the calibration is carried out according to the average values of a plurality of measurement data which are obtained through optical scanning. Therefore, the measurement is scarcely affected by the optical variations due to the position of a printing plate and by the bad influence of noise; that is, the measurement accuracy is very high. Furthermore, since the calibration is carried out by utilizing the maximum value and the minimum value, the calibration mark may be provided at any position, and accordingly printing the calibration mark can be readily achieved.

In the invention, the calibration value of the non-printing-image region is detected from the wide region of a printing plate. Therefore, the optical variations due to the position of the printing plate are averaged, which contributes to an improvement of the measurement accuracy. As the calibration value is obtained with the detector for measuring a picture pattern area, the reliability is very high. Furthermore, as the printing image region is obtained from the averages of a plurality of measurement data, the accuracy is high. As the minimum value is employed as the calibration value, the calibration mark can be provided at any position.

What is claimed is:

1. A method for calibrating a device for measuring the printing image area of a printing plate by detecting the quantity of light reflected from a plate detection region having a non-printing-image region and a printing image region, said method of calibrating comprising:

scanning a predetermined portion of said plate detection region a plurality of times to obtain a plurality of reflected light measurement values representing the measurement of a printing image area;

calculating a plurality of successive average values from said plurality of reflected light measurement values;

selecting a minimum value from among said average values which represents a measurement value from a printing image region of said detection region;

selecting a maximum value from among said average values which represents a measurement value from a non-printing-image region; and calibrating said device by modifying said measurement of a printing area with said maximum and minimum values.

2. A method for calibrating a device for measuring the printing image area of a printing plate by detecting a quantity of light reflected from a plate detection region having a non-printing-image region and a printing image region, said method of calibrating comprising:

scanning a predetermined portion of said plate detection region a plurality of times to obtain a plurality of reflected light measurement values representing the measurement of a printing image area;

calculating a plurality of successive average values from said plurality of reflected light measurement values;

selecting the minimum average value from among said plurality of average values as a first calibration value from said printing image region;

selecting front and rear end portions of said plate as said non-printing-image region to form a calibration region;

scanning said calibration region to obtain a light reflected measurement value representing a second calibration value; and calibrating said device by modifying said measurement of a printing image area with said first and second calibration values.

* * * * *